US007854576B2

(12) United States Patent
Girardin et al.

(10) Patent No.: US 7,854,576 B2
(45) Date of Patent: Dec. 21, 2010

(54) WHEELCHAIR PASSENGER STATION

(75) Inventors: Jean-Marc Girardin, Golden Beach, FL (US); Joe Esteireiro, Weston, FL (US); Andrew Shutter, Cooper City, FL (US); Douglas A. Hobson, Stuart, FL (US); Jules Legal, Winnepeg (CA)

(73) Assignee: Valeda Company LLC, Fort Lauderdale, FL (US)

(*) Notice: Subject to any disclaimer, the term of this patent is extended or adjusted under 35 U.S.C. 154(b) by 302 days.

(21) Appl. No.: 11/861,268

(22) Filed: Sep. 25, 2007

(65) Prior Publication Data

US 2008/0079252 A1 Apr. 3, 2008

Related U.S. Application Data

(60) Provisional application No. 60/846,958, filed on Sep. 25, 2006.

(51) Int. Cl.
*B60P 3/075* (2006.01)

(52) U.S. Cl. .................................. 410/9; 410/7; 410/19

(58) Field of Classification Search ..................... 410/2, 410/3, 4, 7, 9, 10, 11, 19; 297/DIG. 4
See application file for complete search history.

(56) References Cited

U.S. PATENT DOCUMENTS 4,019,752 A * 4/1977 Leon et al. ..................... 280/1
4,458,919 A 7/1984 Kawashima et al.
4,511,171 A 4/1985 Petersen
5,567,095 A * 10/1996 James et al. ................... 410/7
5,570,769 A 11/1996 Eicher et al.
6,231,283 B1 5/2001 Stowers
6,488,333 B2 12/2002 Kim
7,425,110 B2 * 9/2008 Ditch ............................ 410/9
7,455,490 B1 * 11/2008 Goosen ......................... 410/7
2003/0190208 A1 10/2003 Cardona et al.
2006/0159542 A1 7/2006 Ditch

FOREIGN PATENT DOCUMENTS

DE 102005009119 A1 9/2006

OTHER PUBLICATIONS

Douglas A. Hobson, Ph.D. and Clifford E. Brubaker, Ph.D., "Final Report: Summary of Activities Aug. 1, 1993-Nov. 30, 1998" for the University of Pittsburgh Rehabilitation Engineering Research Center (RERC) on Wheelchair Mobility, see especially pp. 69-71.
Photographs of wheelchair passenger stations, dates unknown.

* cited by examiner

*Primary Examiner*—Patricia L Engle
(74) *Attorney, Agent, or Firm*—Baker & McKenzie LLP; David I. Roche; Daniel A. Tallitsch

(57) ABSTRACT

A rear facing wheelchair passenger station for securing a wheelchair in a large accessible transit vehicle. The station includes a forward excursion barrier for preventing forward movement of a wheelchair, lateral excursion barriers for preventing undesired lateral and rearward movement of the wheelchair, wall side flip seats which are adapted to covert the wheelchair passenger station for use by non-wheelchair persons, hand holds, high friction floor material for assisting in the prevention of movement of the wheelchair, and an electro-pneumatic control system.

25 Claims, 10 Drawing Sheets

WHEELCHAIR PASSENGER STATION

CROSS REFERENCE TO RELATED APPLICATIONS

This application claims priority to and incorporates by reference U.S. Provisional Patent Application No. 60/846,958, filed on Sep. 25, 2007.

FIELD OF THE INVENTIONS

The inventions described and claimed herein relate generally to wheelchair securement devices for transport vehicles. More specifically, the inventions described herein relate to a rear facing wheelchair passenger station for securing a wheelchair in a large accessible transit vehicle.

BACKGROUND OF THE INVENTIONS

The present inventions are generally related to providing adequate wheelchair securement in large accessible transport vehicles (referred to herein as "LATVs"). LATVs are transport vehicles which are designed for use by both seated and standing passengers. The Americans with Disabilities Act (ADA) mandates that all public transit service providers must accommodate persons with disabilities, including those who must use a wheelchair as their seat in the transport vehicle. ADA also mandates that, for the safety of the wheelchair user and near-by passengers, the wheelchair must be secured so that it will not move more than 2" in any direction during normal vehicle operation. In addition, four tiedown straps must be attached to the wheelchair—two in front and two in the rear—that are sufficiently strong to withstand a crash event that could generate total forces as high as 4000-5000 lbs on the rear tiedowns. Occupant restraint belts must also be made available in the wheelchair stations, but there is no requirement that they be used.

Although securement straps that meet these requirements are the norm in today's LATVs in the US, a number of pressing problems remain with the prior art four-point strap-type securement technology. For example, the prior art devices are difficult to apply, especially on the wall side of the vehicle. Also, the LATV operator ("operator") must leave the driver's station to attach the prior art devices, which not only significantly increases the dwell times at stops but also requires the operator to encroach into the wheelchair person's personal space. As a result, the prior art devices are often misapplied, or worst still, are not used at all. Most importantly, the prior art securement approach also means that wheelchair passengers do not have independent access to public transportation equal to that of all other passengers.

In Europe and Canada, rear-facing wheelchair passenger stations (referred to herein as "RF-WPSs") are quickly becoming accepted and, in Europe, RF-WPSs are now the norm for LATVs. The RF-WPSs are passive in that the RF-WPSs do not physically connect the wheelchair to the vehicle, and instead rely upon various barriers to control wheelchair movement. Typically, the barriers located within a RF-WPS include a rear-facing padded bulkhead (also termed forward excursion barrier ("FEB") against which the wheelchair is backed. The FEB is intended to prevent forward movement of the wheelchair in the vehicle when it is braking. On the aisle-side of the WPS there is often a floor-to ceiling stanchion (steel tube) barrier, that is intended to prevent rotation or tipping of the wheelchair towards the aisle (laterally) during vehicle turns. Some installations do not include a lateral barrier (stanchion), therefore placing the wheelchair at high risk of tipping or swerving into the aisle.

The prior art RF-WPSs are not designed to handle crash magnitude forces and instead are only concerned with forces which are expected to be generated during emergency driving events, such as maximum braking or swerving. This approach assumes that, because of the relative safety of LATVs used in fixed route service, it is highly unlikely that LATVs carrying wheelchair users will be in a vehicle collision. Based upon research studies involving emergency driving of LATVs, the maximum deceleration force which may be encountered during emergency driving events is believed to be less than 1 g.

The RF-WPS concept has the potential of resolving many of the problems of the prior art four-point strap-type devices, in that the wheelchair user gains independent use of public transportation, the operator can remain in the drivers station, and bus stop dwell times are reduced. However, there are still several problems with the prior art RF-WPSs. For example, it is understood that the prior art RF-WPSs allow wheelchairs to move in excess of 2" during severe driving conditions, which may cause some types of wheelchairs to tip or swing into the aisle. As a result, auxiliary securement straps attached by drivers are required to prevent such tipping, which nullifies one of the main goals and advantages of the RF-WPS concept—user independence. Also, prior art devices do not allow a close proximity fit between the wheelchair occupant and the FEB, which increases the injury risk in the event of panic breaking or a frontal collision. Finally, prior art lateral barrier installations often protrude into the center bus aisle creating passenger flow problems, as well as maneuvering problems for a second wheelchair passenger.

SUMMARY OF THE INVENTIONS

The wheelchair stations described and claimed herein solve at least some of the problems of the prior art rear facing wheelchair passenger stations by: limiting wheelchair movement in all directions, including tipping into the aisle; removing the need for auxiliary strap(s), providing closer proximity between the user and the FEB, and relocating the lateral barrier, thereby providing much improved wheelchair maneuverability, as well routine passenger flow down the middle aisle.

The wheelchair passenger station described herein is adapted to be a complete stand-alone "drop-in" wheelchair station for LATVs. However, it is contemplated that various components of a wheelchair passenger station may be incorporated piecemeal into LATVs, as opposed to a "complete drop-in" system.

Note that, although the present inventions are described herein with reference to LATVs, which could include large transit buses, commuter train cars, and the like, the present inventions are not intended to be limited to such application. Indeed, at least some of the claims herein are directed to wheelchair passenger stations for vehicles, generically, and not specifically to LATVs.

A wheelchair passenger station of the present inventions is adapted to fit into the current ADA 48"×30" minimum wheelchair space, which is required for all LATVs in the US. One embodiment of the wheelchair passenger station described herein provides containment for an occupied wheelchair through use of six integrated components: a forward excursion barrier, at least one lateral excursion barrier, at least one wall side flip seat, at least one hand-hold, high friction floor material, and an electro-pneumatic control system. Another embodiment of the wheelchair passenger station described herein comprises two components: a forward excursion barrier (which includes an integrated aisle-side lateral excursion barrier) and a wall-side lateral excursion barrier. Other embodiments of the present invention include some combination of the above- and below-mentioned components.

The forward excursion barrier is a head and back support which is mounted in the front area of the wheelchair passenger station. The forward excursion barrier resists forward movement of a wheelchair and is intended to serve as the wheelchair stop and occupant head restraint during emergency braking events. The lateral excursion barriers are electro-pneumatically activated aisle and wall side arms or barriers that prevent excessive lateral movement or tipping during vehicle swerving events. These barriers stow in such a manner so as not to impede the safe use of the WPS by other passengers when no wheelchair is present. The wall side flip seats are narrow profile flip seats that are normally biased in the up position to allow unassisted access by wheelchair users, but are available for use by other passengers when there is no wheelchair present. The hand holds are grab bars, which are suitably placed within the wheelchair passenger station for use by all passengers. The floor material has high coefficient of friction properties. As such, the high friction floor material allows the wheelchair brakes to be an effective part of its securement. The electro-pneumatic control system is a semi-automated control system that transfers control of the activated side-arms or barriers (and therefore wheelchair containment) between the wheelchair user and the vehicle operator, depending on whether the vehicle is stationary at a stop or is in motion, respectively.

BRIEF DESCRIPTION OF THE DRAWINGS

These and other features, aspects, objects, and advantages of the inventions described and claimed herein will become better understood upon consideration of the following detailed description, appended claims, and accompanying drawings where:

Figure 1:
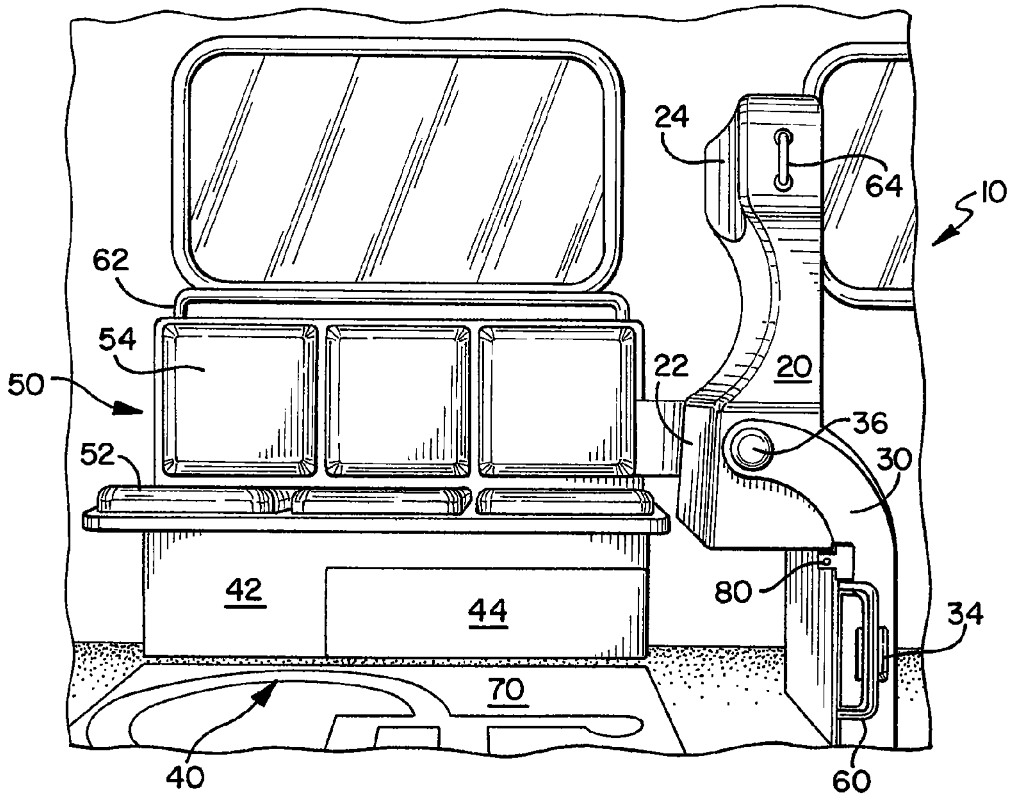
FIG. 1 is a side view of a first embodiment of a wheelchair passenger station configured for seating of non-wheelchair persons (i.e. passenger seating position)

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

Like reference numerals will be used to refer to like or similar parts from Figure to Figure in the following description of the drawings.

DETAILED DESCRIPTION OF THE DRAWINGS

Figure 6:
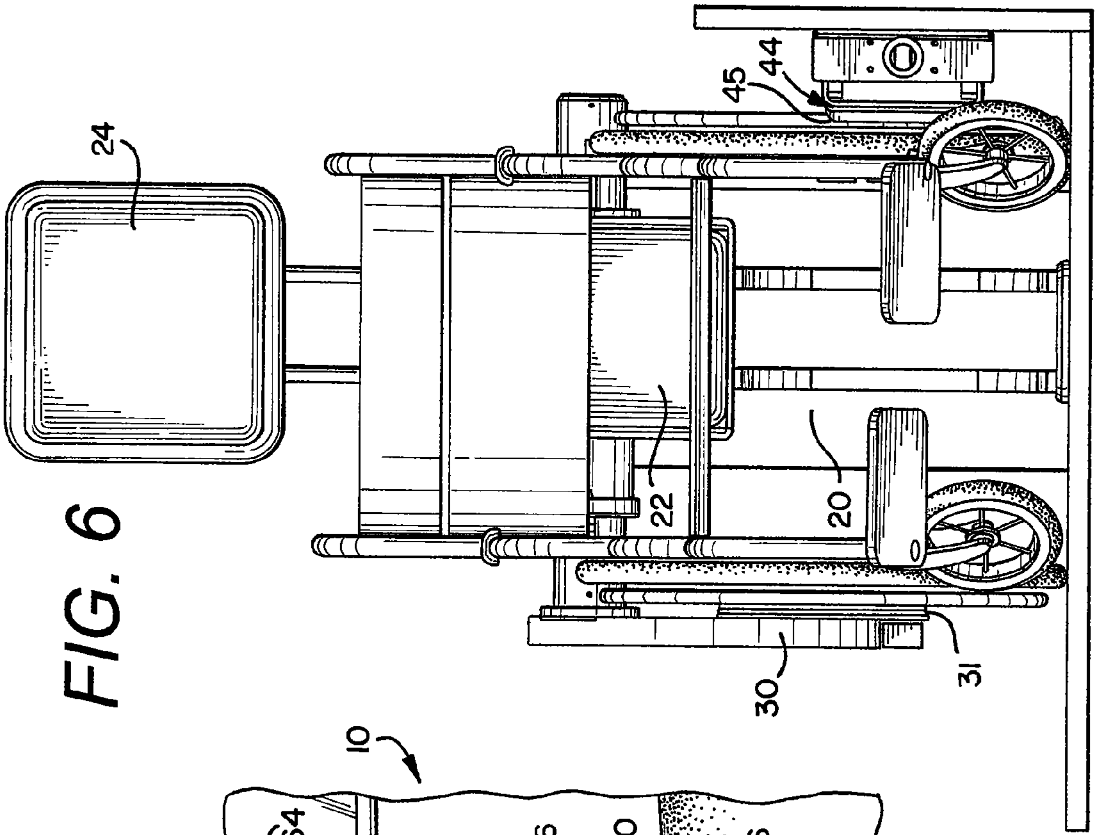
FIG. 6 is a front elevational view showing a wheelchair being held in a secured position by engagement of the aisle side arm and wall barrier with the wheels of the wheelchair
Figure 5:
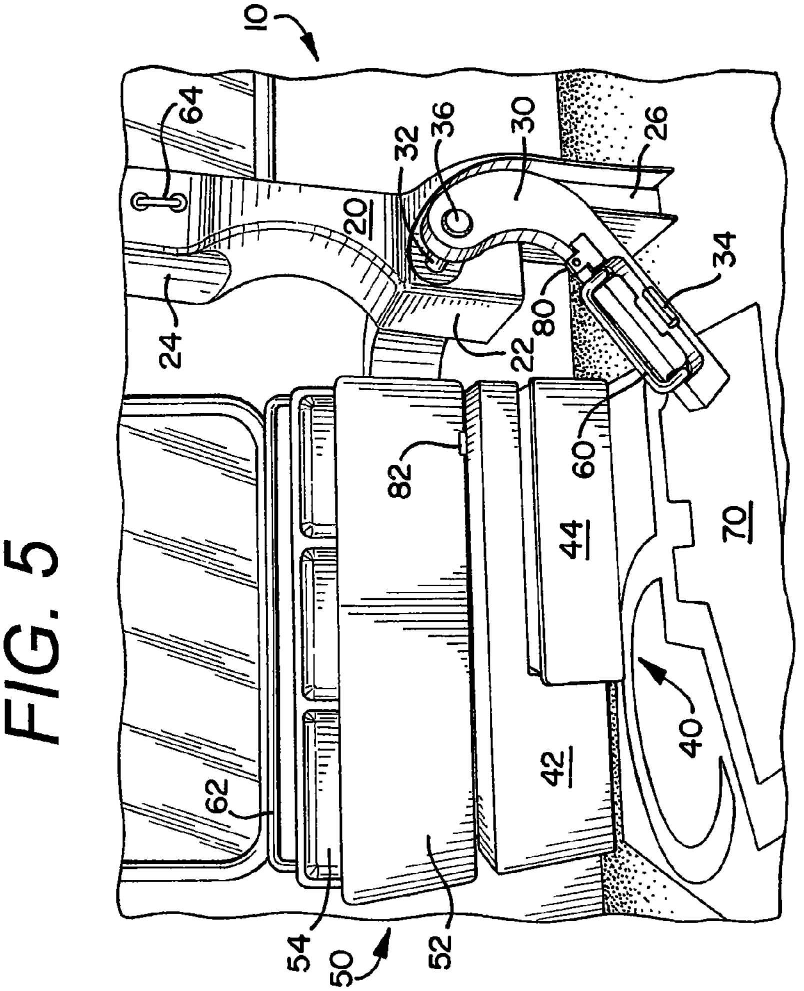
FIG. 5 is a perspective view of the same captured during the fourth step of the wheelchair securement wherein a handhold is deployed such that the wheelchair passenger station fully secures the wheelchair and provides grab bars for the convenience of the wheelchair person (i.e. the wheelchair secured position) and other standing passengers.
Figure 8:
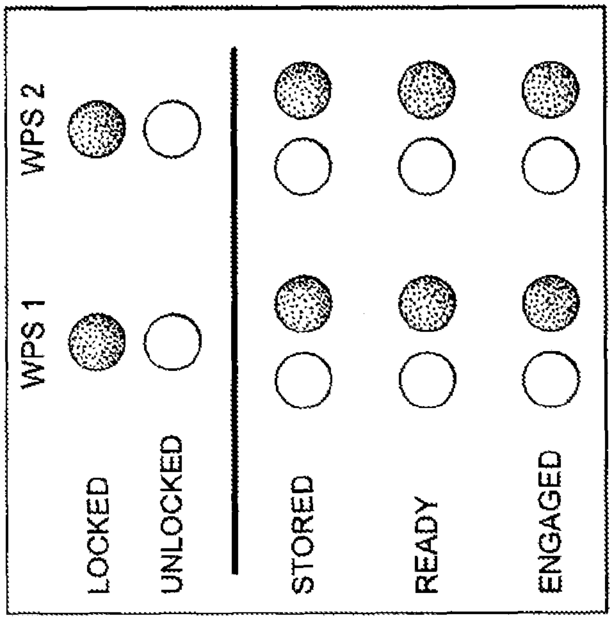
FIG. 8 illustrates the control panel located in the operators station, so as the operator can transfer control of the WPS activation to the user by activating the lock and unlock switches. The control panel also allows the operator to observe the status of the wheelchair containment by observing the status lights 'Stored', 'Ready' or 'Engaged'.
Figure 9:
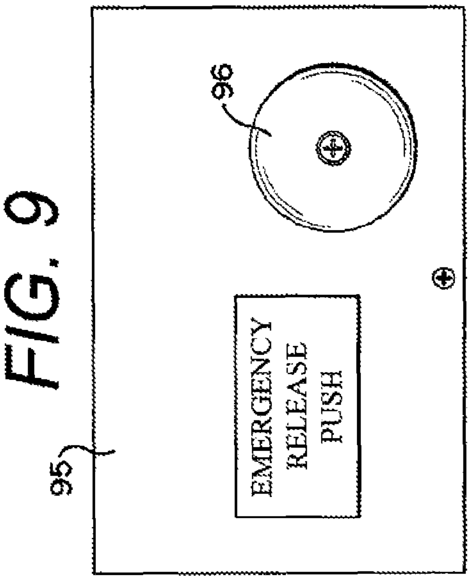
FIG. 9 illustrates the emergency release activation button that is located on the FEB, so disengagement of the lateral barriers can always be achieved in the event of a electrical power failure on the vehicle.
Figure 7:
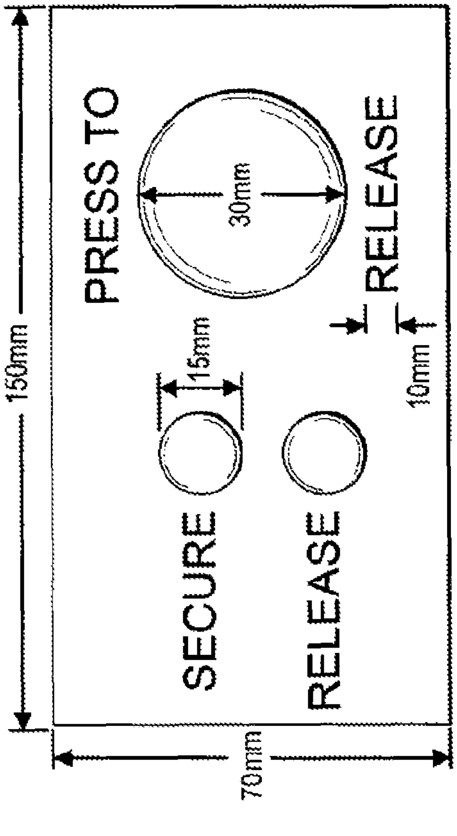
FIG. 7 illustrates the control panel located in the WPS, most likely on the bottom of a flip up seat, so as the control button can be activated by a wheelchair user.

FIGS. 1 through 6 represent the various consecutive configurations of a first embodiment of a wheelchair passenger station 10 during the wheelchair securement process, while FIGS. 7-9 depict control panels for the control system of the first embodiment of the wheelchair passenger station 10. As depicted in the Figures, the wheelchair passenger station 10 comprises a forward excursion barrier 20, two lateral excursion barriers 30, 40, a flip seat 50, two hand holds 60, 62, high friction floor material 70, and an electro-pneumatic control system (not shown in its entirety for the first embodiment).

The forward excursion barrier 20 generally comprises a wheelchair and back rest stop 22 and a head restraint 24. The wheelchair stop 22 is adapted to engage with the lower rear seat level of the wheelchair (not shown) to correctly position the wheelchair for proper engagement with the lateral excursion barriers 30, 40 and the support 24 is adapted to restrain the wheelchair person's head and back during an emergency driving events wherein the wheelchair person would be subject to forwardly directed forces. In addition, the upper surface of the wheelchair stop 22 and head restraint 24 serve as a stand-sit support surface for a standing passenger when a wheelchair is not in the wheelchair passenger station. The wheelchair stop 22 and the head restraint 24 preferably comprise high density polyurethane foam similar to car head rests, although the invention is not limited as such.

There are two lateral excursion barriers, an aisle side arm (or aisle side barrier) 30 and a wall side barrier 44. The aisle side arm 30 preferably extends from the forward excursion barrier 20 and is adapted to be disposed in a recessed portion 26 of the forward excursion barrier 20 when the wheelchair passenger station 10 is configured in the stored position to allow seating of non-wheelchair persons. However, it is contemplated that the aisle side arm 30 may be disposed in any other component of the wheelchair passenger station or even in any other component of the LATV, such as the floor. The aisle side arm 30 is preferably interconnected to the forward excursion barrier 20 by a shaft or driven piston 32 which is adapted to not only extend laterally from the forward excursion barrier 20 but also rotate. The aisle side barrier 30 preferably includes a warning light 36 (and possibly an additional or alternative audible warning—not shown) to warn passengers of imminent movement of the aisle side barrier 30, although it is contemplated that the warning light (or speaker for audible warnings) may be disposed on another component of the wheelchair passenger station 10 or even to another component of the LATV.

The wall side barrier 44 is preferably disposed on the wall side of the LATV below the flip seat 50. The wall side barrier 44 preferably comprises a housing 42 and a barrier 44 which is adapted to extend outwardly from the housing 42. The barrier 44 is preferably interconnected to the housing by a electro-pneumatically activated mechanism which is adapted to extend laterally from the housing 42. The wall side barrier 44 is preferably controlled in concert with the aisle side barrier so that they engage simultaneously and exert a predetermined equal (or approximately equal) and opposite force on the wheelchair. The wheelchair contact pad 45 of the wall side barrier 44 is made of an abrasion resistant, high-friction, elastomeric material (with or without a covering or upholstering) so as not to damage the wheelchair and provide maximum resistance to wheelchair movement relative to the vehicle. The aisle side arm 30 has a similar contact pad 31 that is made of the same or similar material as is the contact pad 45.

Both the wall side barrier 40 and the aisle side arm 30 include wheelchair engaging surfaces. These surfaces may be comprised of a soft or spongy material to firmly engage, but not damage, the wheels and spokes of a wheelchair. To provide adequate securement of a wheelchair, it is desirable that the wall side barrier 44 provide approximately 50 lbs of force on the right side wheel of the wheelchair and that the aisle side barrier 30 provide approximately 50 lbs of force on the left side wheel of the wheelchair, although similar results may be obtained with more or less force. The aisle-side barrier is adapted to rotate to the wheelchair engagement position in such a manner to minimize the possibility of contact with the wheelchair occupant.

The flip seat 50 is generally comprised of at least one seat 52 and at least one seat back 54. Preferably, however, there are two seats 52 and two seatbacks 54 which are interconnected. Each of the at least one seat 52 is capable of being flipped upwards such that it is adjacent to the respective seat back 54 and downward such that it is usable for passenger seating. Preferably, the flip seat 50 is provided with a biasing means (not shown), such as a spring, for biasing the seat 52 in the upward position. Non-wheelchair persons who desire to use the seating would simply flip the seat 52 into the lowered position. Alternatively, the flipping operation can be incorporated into the electro-pneumatic control system (not shown) wherein the seat 52 would by default be aligned in the down position and would only be raised when needed to provide space for wheelchair seating.

There are three hand holds 60, 62 and 64 on the wheelchair passenger station 10, the first of which 60 extends from the aisle side arm 30 and is disposed in a recessed portion 34 on the arm 30. The hand hold 60 is adapted to be deployed from the arm 30 when the wheelchair passenger station is configured to the wheelchair secured position. Alternatively, the handhold 60 may be permanently deployed and ready for use. The second hand hold 62 of the passenger station 10 is fixed above the flip seat back 54 and the third hand hold 64 is fixed to the forward excursion barrier 20, preferably on the aisle side of the head restraint 24. Various other locations for the hand holds are contemplated.

The high friction floor material 70 provides additional resistance to movement of a wheelchair by enhancing the effectiveness of the wheelchair brakes. The floor material 70 is preferably disposed on the floor of the LATV in the 48"×30" minimum floor area, although it is contemplated that the high friction floor material 70 could extend through a greater portion of the LATV floor. Indeed, it is contemplated that the high friction floor material could extend throughout the entire LATV floor. Many materials, known and unknown, could adequately serve the purpose of the high friction floor material 70, especially if the material has a coefficient of friction of greater than 0.6. For example, the flooring material Altro Transfloor Meta 2.2 could be used. Preferably, the high friction floor material 70 includes printing which identifies the wheelchair passenger station 10 as a designated wheelchair seating location. It has been observed, however, that the high friction floor material 70 may not be necessary since standard bus floors currently have enough friction for the disclosed systems to effective work.

The wheelchair station 10 may also include an occupant restraint belt to restrain rearward movement of the wheelchair occupant. The occupant restraint belt comprises a belt (not shown) and a buckle, the buckle preferably comprising a male connector 80 and a female connector 82. The male connector is interconnected to the aisle side arm 30 and the female connector 82 is interconnected to the wall side barrier 44, although such configuration may be reversed. The female connector 82 may also be interconnected to the housing 42, as depicted in the figures. It is contemplated that the belt (not shown) may be attached to either the male connector 80 or the female connector.

Figure 2:
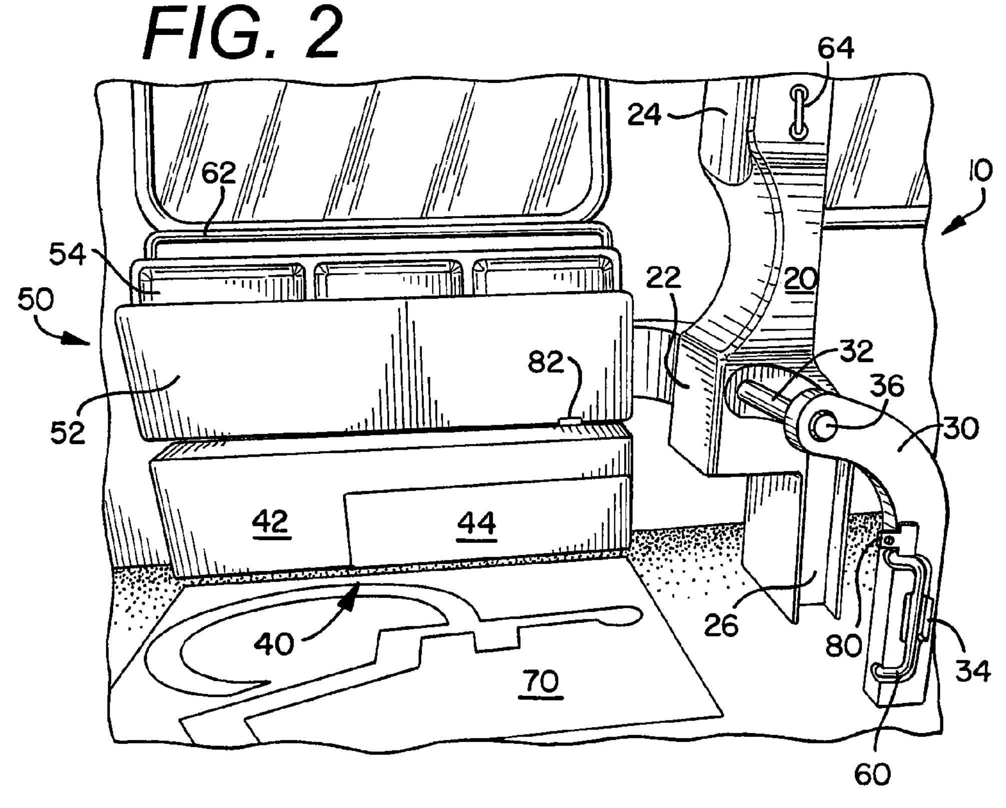
FIG. 2 is a perspective view of the same captured during the first step of wheelchair securement wherein the aisle side arm is extended outward from the forward excursion barrier and the flip seat is biased in the up position such that the wheelchair passenger station is configured for receiving a wheelchair (i.e. wheelchair ready position)
Figure 3:
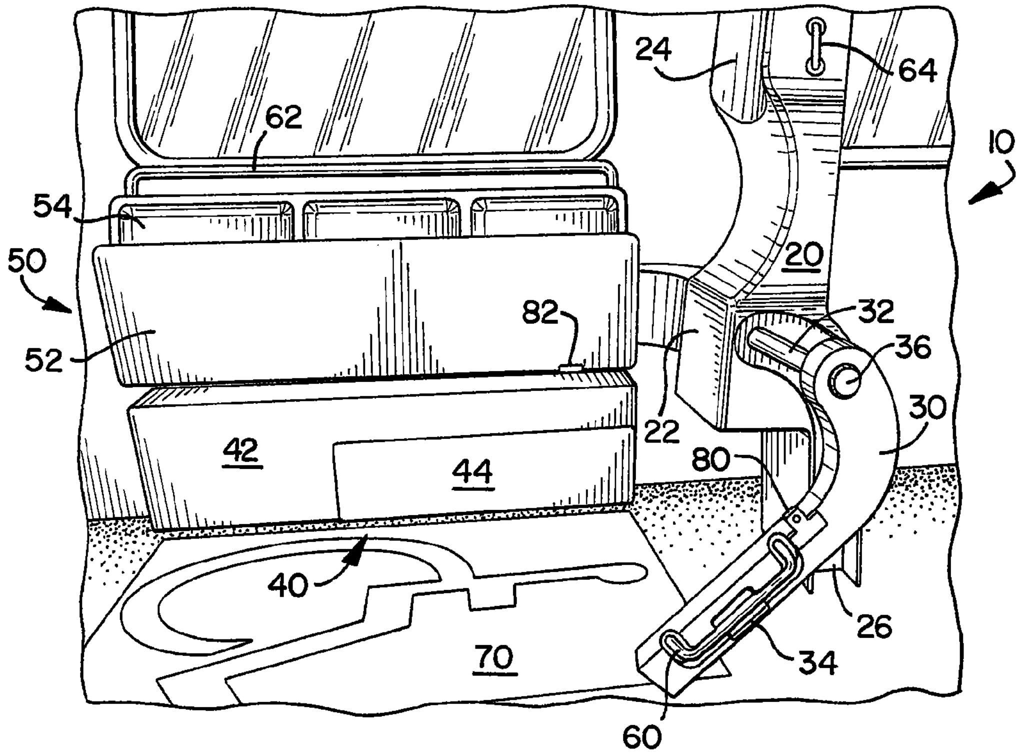
FIG. 3 is a perspective view of the same captured during the second step of wheelchair securement wherein the aisle side arm is rotated into the wheelchair space.
Figure 4:
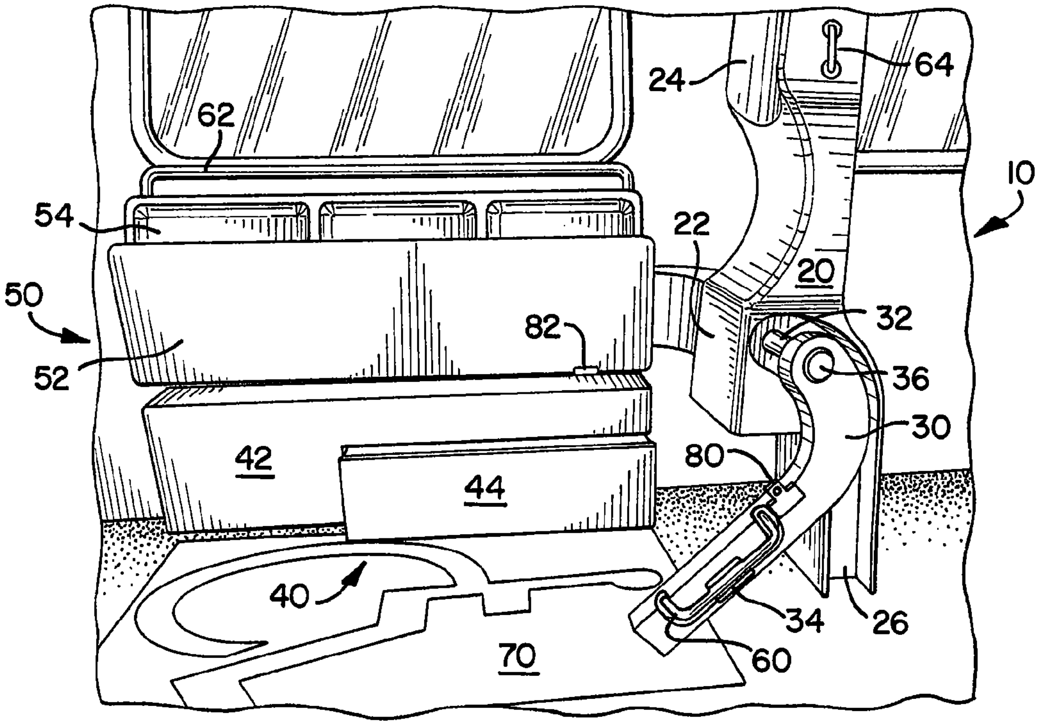
FIG. 4 is a perspective view of the same captured during the third step of wheelchair securement wherein the aisle side arm and wall barrier are deployed to engage with the wheels of the wheelchair (i.e. the aisle side arm and wall barrier "squeeze" the wheelchair)

Beginning with FIG. 1, the wheelchair passenger station 10 is configured in the passenger seating position wherein the lateral excursion barriers 30, 44 are retracted (stored) and the flip seat 50 is in the down position. As such, the wheelchair passenger station 10 is configured for seating of non-wheelchair persons. Turning now to FIG. 2, the wheelchair passenger station 10 is configured in the wheelchair ready position wherein the aisle side arm 30 is deployed laterally from the forward excursion barrier 20 and the flip seat 50 is retracted in the up position. This configuration represents the first step in the wheelchair containment process. Note that this configuration of the wheelchair passenger station 10 is the wheelchair ready position, and it is contemplated that other configurations may be used for the wheelchair ready position. In FIG. 3, a freeze-frame of the wheelchair passenger station 10 is shown during the second step in the wheelchair containment process where the aisle side arm 30 is rotated rearwardly into the wheelchair seating area. As such, the aisle side arm 30 is properly aligned for engagement with the wheelchair. In FIG. 4, a freeze-frame of the wheelchair passenger station 10 is shown during the third step in the wheelchair containment process where the aisle side arm 30 and the wall side barrier 40 engage the wheels of a wheelchair to provide adequate containment of the wheelchair. Finally, in FIG. 5, the wheelchair passenger station is shown in the wheelchair secured position wherein the aisle side arm 30 and the wall side barrier 40 are adapted to be securely engaged with the wheels of the wheelchair and the hand hold 60 is fully extended for the convenience of the wheelchair person.

FIG. 6 shows a standard manually operated wheelchair being held in a secure position by the aisle side arm and wall barrier, each of which snugly engages a wheel of the wheelchair. The compressive force applied to the wheelchair for the first embodiment is in the range of about 40 to 60 lbs per side, for a total of 80 to 120 lbs. It is preferable, but not essential, that the compressive or gripping force applied by the side arm and wall barrier to the wheelchair be applied by a pneumatic system in which a common source of compressed air supplies each of the opposing sides, i.e., the side arm and the wall barrier, to ensure that balanced forces are applied to the wheelchair. By using a common source of compressed air to supply the driving force for both the aisle side arm and the wall barrier, the wheelchair will be less likely to move during the process of being secured, and it is more likely that a good and secure grip will be made on the wheelchair.

The following is a description of the operation and control of an exemplary wheelchair passenger station shown and described herein:

As the bus stops and the driver knows that one of the two WPSs on the vehicle will be used. The lateral containment barriers are in the stored position. Control is a 12 V electrical system with built-in wheelchair position sensors and switch activated activation by both the wheelchair user and operator.

Description of Control Process:

- A) Driver activates the WPS and prepares it for access
  - a. Light flashes in/around the WPS to warn close by passenger of pending movement of aisle side arm
  - b. aisle side arm moves laterally but remains in vertical orientation
- B) Wheelchair Occupant backs into the WPS and hits a button located on bottom of flip seat which rotates aisle-side arm and then closes both arms to engage and secure wheelchair. Driver notified by light color change that wheelchair is secure.
  - a. During transport, only the driver can override the system and/or the emergency release
  - b. WPS controls are null/void once the vehicle is in motion
- C) Bus approaches requested stop.
  - Wheelchair occupant hits stop request button located on bottom of flip seat
- D) Bus stops at requested bus stop:
  - a. Driver transfer control to WPS
  - b. Wheelchair Occupant hits button to release the system
  - c. Arms reverse movement.
  - d. Wheelchair exits WPS, driver notified
  - e. Arms return to stored position by driver:

Vehicle Entry: A wheelchair user enters the vehicle. Depending on whether WPS 1 or WPS 2 will be used, the operator activates the 'Ready' green button 110 in the driver's station control panel 100, shown in FIG. 8. A warning light 36 activates in the wheelchair passenger station 10 and the aisle side arm 30 deploys to the wheelchair-ready position. The wheelchair user proceeds to the wheelchair passenger station 10 and backs into it until stopped by the forward excursion barrier 20. A sensor will then detect the presence of the wheelchair and will deploy both the aisle side and wall side lateral barriers (arms) 30, 40. The arms 30, 40 engage the wheelchair (wheels) and the operator is electronically notified accordingly ('Engaged'-green, FIG. 8). The operator then assumes control by locking out control access from the wheelchair passenger station and proceeds on the route.

Vehicle Exit: The wheelchair passenger electronically notifies the driver of a desire to exit the LATV at the next stop. At the vehicle comes to a stop, the operator transfers control to the wheelchair passenger station (FIG. 8) and the wheelchair user de-activates the lateral barriers by pressing the 'Release' button 92 on the wheelchair station control panel 90, as shown in FIG. 7. The warning alarm light 36 again activates and the arms 30, 40 automatically return to the wheelchair-ready position. The wheelchair user exits wheelchair passenger station and the operator electronically returns the arms 30, 40 to the stored position ("Stored" in FIG. 8) at which point the alarm light 36 turns off.

FIG. 9 shows the emergency control panel 95 and emergency release button 96 that is located on the rear of the FEB, or near thereby, so that manual disengagement of the lateral barriers can be done in the event of a power system failure on the vehicle. The second embodiment of the wheelchair passenger station 110, described in detail below, includes two similar emergency control panel 95, one near the FEB (optimal location would be on the bottom of the flip in a location where the wheelchair passenger could reach, but not too easily so as to have the barriers accidentally disengaged. The other is disposed near the driver control panel.

A second embodiment of the wheelchair passenger station 110 is shown in FIGS. 10-14. Like the first embodiment, the second embodiment of the wheelchair passenger station 110 is configured for restraining a rear-facing (relative to the direction of travel of the vehicle) wheelchair and comprises a forward excursion barrier 120, an aisle side lateral excursion barrier 130, a wall side lateral excursion barriers 140, and an electro-pneumatic control system for controlling the movements of the aisle side and wall side lateral excursion barriers 130, 140. Although not shown, it is contemplated that the second embodiment will include a flip seat (not shown) along the wall of the vehicle (i.e., above the wall side lateral excursion barrier 140) and a lap belt. A female buckle for the lap belt can be located on the arm (halfway down on the inside of the aisle side barrier) and a regular lap belt retractor (ELR) with male connector can be located coming from wall or underside of flip seat.

The forward excursion barrier 120 of the second embodiment comprises a wheelchair stop 122 and a head restraint 124. In the second embodiment, the wheelchair stop 122 and head restraint 124 define a generally continuous support surface, although it is contemplated that the support surface may be discontinuous, like the first embodiment (discussed above) and the third embodiment (discussed below) to accommodate wheelchairs which include a tie bar between the handles.

The wheelchair stop 122 is adapted to engage with the lower rear seat or seat back level of the wheelchair (not shown) to correctly position the wheelchair for proper engagement with the lateral excursion barriers 130, 140. The head support 124 is adapted to restrain the wheelchair person's head and/or back during an emergency driving event wherein the wheelchair person would be subject to forwardly directed forces (relative to the direction of the vehicle). In addition, the upper surface of the head restraint 24 serves as a stand-sit support surface for a standing passenger when a wheelchair is not in the wheelchair passenger station. The wheelchair stop 122 and the head restraint 124 preferably comprise high density polyurethane foam similar to car head rests, although the invention is not limited as such. Another option would be to have the barrier 120 fabric covered in the wheelchair stop and head restraint regions 122, 124, without the use of a cushion. This option presents a more vandalism resistant design.

There are two lateral excursion barriers, an aisle side arm (or aisle side barrier) 130 and a wall side barrier 140. For a description of how the forward and lateral excursion barriers 120, 130, 140 of the second embodiment move or operate to secure a wheelchair, reference may be had to FIGS. 1-6 and the discussion above concerning those figures. Essentially, when the wheelchair passenger station 110 is not being used by a wheelchair person, the station 110 is configured to accommodate non-wheelchair persons (see, for example, FIGS. 1 and 10). In such configuration, the lateral excursion barriers 130, 140 are retracted (or stored) and the flip seat (if present) is in the down position (or can be folded down by the non-wheelchair person). When a wheelchair person enters the bus, the wheelchair passenger station 110 is configured to allow the wheelchair person to back into the station 110 (see, for example, FIG. 2). In such configuration, the aisle side arm 130 is deployed laterally from the forward excursion barrier 120 and the flip seat (if present) is retracted in the up position. The flip seat can be biased to the up position by spring-type or other means. Alternatively, the flip seat can be controlled by the wheelchair passenger station control system. Depending upon the aisle width, the aisle side arm 130 may not be deployed until after the wheelchair person has traveled down the aisle, past the station 110. Nevertheless, once the arm 130 is laterally deployed, the wheelchair person can back into the station 110 such that the back of the wheelchair is disposed adjacent to the forward excursion barrier (see, for example, FIG. 6—note, however, at this point the lateral barriers 130, 140 would not be engaging the wheelchair). Once the wheelchair is backed into place, the operator and/or passenger can initiate the locking sequence. Once the locking sequence is initiated, the aisle side arm 130 is rotated rearwardly into the wheelchair seating area. As such, the aisle side arm 130 is properly aligned for engagement with the wheelchair (see, for example, the freeze-frame in FIG. 4). At this point, the wall side barrier 140 and aisle side barrier 130 move laterally in concert so that they engage and squeeze the wheelchair simultaneously (assuming the wheelchair is centered in the station 110) and exert a pre-determined equal (or approximately equal) and opposite force on the wheelchair (see, for example, FIGS. 5, 6, and 11). The total force exerted on the wheelchair ideally ranges between 100 and 150 pounds of force (50-75 pounds per side). A lesser force may be sufficient for heavier wheelchairs (i.e., like the first embodiment, which has a range between 80-120 pounds of force), which have greater inertia, but may not be sufficient to restrain lighter wheelchairs. A greater force obviously would adequately restrain a wheelchair, regardless of whether it is heavy or light, but at the risk of potentially damaging the wheelchair or injuring the wheelchair person or other bystanders if, for example, a hand or other body part finds its way between the barriers 130, 140 and the wheelchair. Like the first embodiment of the wheelchair passenger station, it is preferable, but not essential, that the compressive or gripping force applied by the side arm 130 and wall barrier 140 to the wheelchair be applied by a pneumatic system in which a common source of compressed air supplies each of the opposing sides, i.e., the side arm and the wall barrier, to ensure that balanced forces are applied to the wheelchair. By using a common source of compressed air to supply the driving force for both the aisle side arm 130 and the wall barrier 140, the wheelchair will be less likely to move during the process of being secured, and it is more likely that a good and secure grip will be made on the wheelchair. The source of compressed air can be the vehicles pneumatic system, or can be a stand-alone, mini compressor which ideally is housed in the forward excursion barrier 120. A stand-alone compressor may be useful in applications where the vehicle does not have a central pneumatic system, or where it would be inconvenient to run pneumatic lines to the wheelchair passenger station 110.

With reference again to FIGS. 10-12, the aisle side arm 130 extends from the forward excursion barrier 120 and, although not necessary, is adapted to be at least partially disposed in a recessed portion 126 of the forward excursion barrier 120 when the wheelchair passenger station 110 is placed in the stored position to allow seating of non-wheelchair persons and to allow easier access to the wheelchair passenger station by wheelchair persons. It is contemplated that the aisle side arm 130 may extend from any other component of the wheelchair passenger station or even from any other component of the LATV, such as the floor. The aisle side barrier 130 preferably includes a warning light (not shown for second embodiment, but see warning light 36 and 236 for first and third embodiments) (and possibly an additional or alternative audible warning via a speaker—not shown, but intended to be disposed within the control box of the forward excursion barrier 120 where the linear slide 136 and rotary actuator 134 are disposed) to warn passengers of imminent movement of the aisle side barrier 130. The warning light may be disposed on the arm 130, like the first embodiment, although it is contemplated that the warning light (or speaker for audible warnings) may be disposed on another component of the wheelchair passenger station 110 or even on any component of the LATV.

Figure 12:
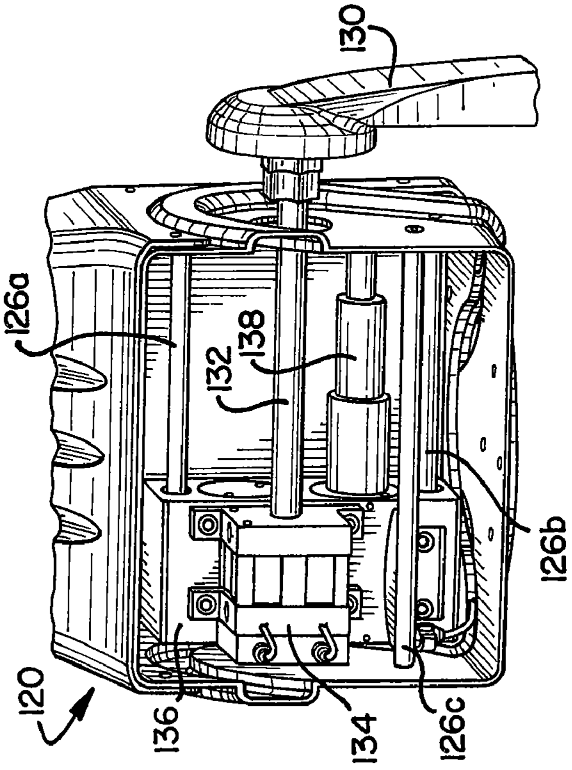
FIG. 12 is a rear view of the same, with the rear panel of the forward excursion barrier removed.

Referring now primarily to FIG. 12, the aisle side arm 130, as shown, is operated by an electro-pneumatic control system, comprising primarily of a rotary actuator 134 and a double acting telescopic linear slide 136. The rotary actuator and double acting telescopic linear slide 136 are configured to act in cooperation to impart both linear (in the lateral direction) and rotative movement to the aisle side arm 130. More specifically, the rotary actuator 134 is connected to the aisle side arm 130 via a shaft 132 to impart rotative movement to the aisle side arm. The rotary actuator 134 operates in usual fashion whereby it includes two air inlets. Directing compressed air to one inlet causes the actuator to rotate in a first direction and directing compressed air to the other inlet causes the actuator to rotate in an opposite direction. The shaft is rigidly connected at one end to the rotary actuator 134 and is rigidly connected at the opposite end to the aisle side arm 130. The shaft 132 forms the pivot point about which the aisle side arm 130 is configured to rotate or pivot.

The linear slide 136 is rigidly connected to the rotary actuator 134 to impart linear movement to the rotary actuator 134. Since the rotary actuator 134 is rigidly connected to the aisle side arm 130, the linear slide 136 also imparts linear movement to the arm 130. The linear slide 136 is configured to ride along rails 126*a*, 126*b* and includes a pair of telescoping pistons, one on either side, which bear against opposite inside surfaces of the barrier. The linear slide 136, as shown, operates in usual fashion whereby it includes two air inlets. Directing compressed air to one of the inlets causes the linear slide 136 to move in one direction and directing compressed air to the other inlet causes the linear slide 136 to move in the opposite direction.

It has been observed that the rotary actuator 134 should be capable of imparting approximately 300 in-lbs of torque and the linear slide 136 should be capable of imparting approximately 75 lbs of force. For example, it has been found that off-the-shelf rotary actuators and linear slides manufactured by Turn-Act are sufficient for these purposes.

Although the rotary actuator 134 and linear slide 136 are pneumatically powered, it is contemplated that electrically, hydraulically or alternatively powered actuators and slides are equivalent and could be used. Moreover, it is contemplated that various other mechanisms and configurations of such mechanisms could be used in an equivalent manner to achieve the same results as the specific system disclosed herein.

Figure 10:
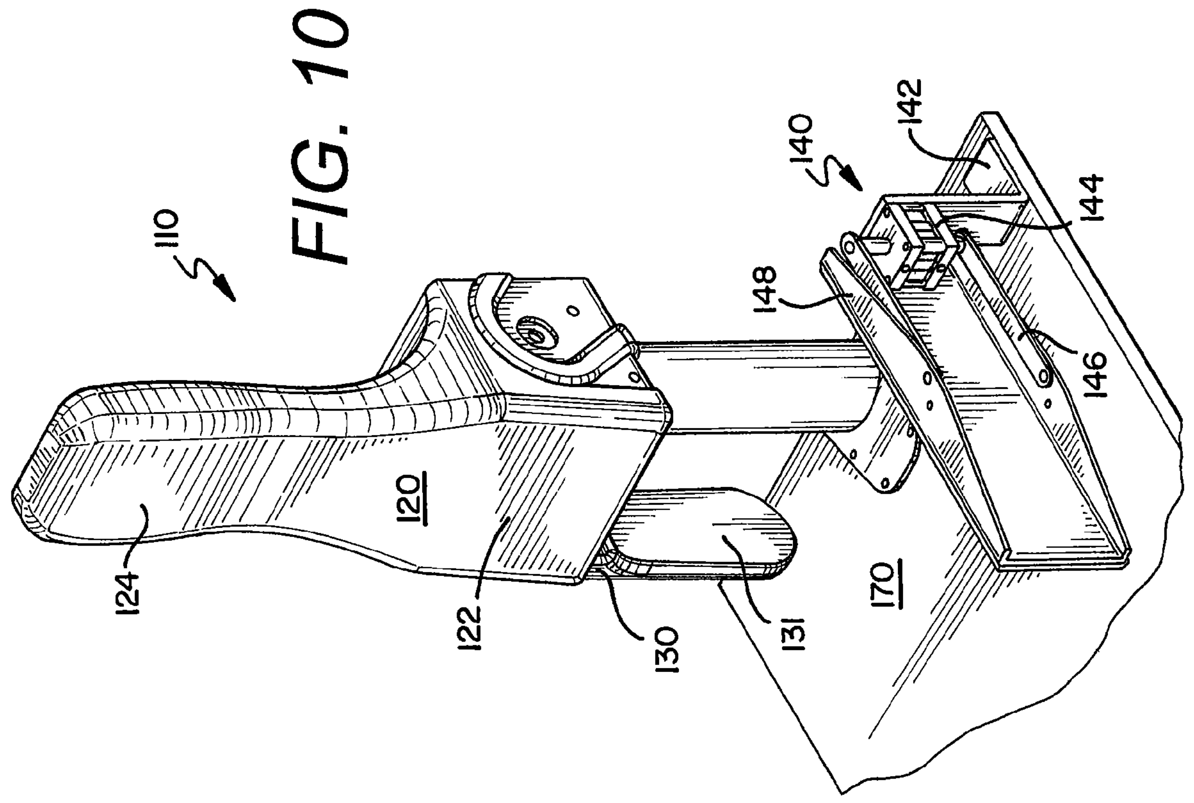
FIG. 10 is a first perspective view of a second embodiment of a wheelchair passenger station with the lateral excursion barriers placed in a stored, retracted position.

Referring now primarily to FIG. 10, the wall side barrier 140, as shown, is disposed on the wall side of the LATV, and is intended to be disposed below a flip seat (not shown). The wall side barrier 140 includes a bracket 142 for connecting the barrier 140 to a floor surface 170 of the vehicle. Although the bracket 142 attaches the barrier 140 to a floor surface 170, it is contemplated that a similar bracket could be used for connected the barrier 140 to a wall surface, or any other surface, of the vehicle, including the flip seat. The bracket is directly connected to a rotary actuator 144, which in turn is connected to pivot arms 146, which in turn are connected to a contact member 148. Another alternative configuration of the barrier 140 would comprise the rotary actuator 144, or any other equivalent component, being directly connected to the floor, wall, or any other surface of the vehicle.

The rotary actuator 144 operates in usual fashion whereby it includes two air inlets. Directing compressed air to one inlet causes the actuator to rotate in a first direction and directing compressed air to the other inlet causes the actuator to rotate in an opposite direction. It has been observed that the rotary actuator 144 should be capable of imparting approximately 300 in-lbs of torque. For example, it has been found that the off-the-shelf rotary actuators manufactured by Turn-Act are sufficient for this purpose.

Figure 11:
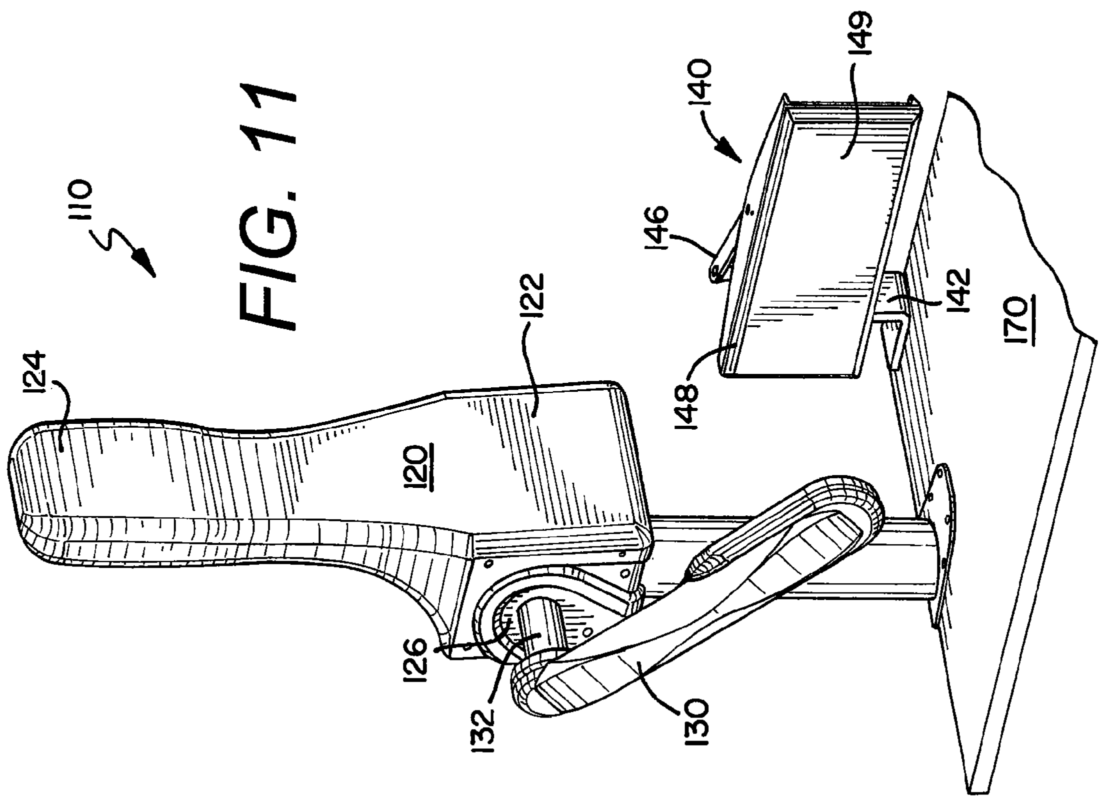
FIG. 11 is a second perspective of the same with the lateral excursion barriers placed in an extended, wheelchair engaged position (the wheelchair, which would normally be present between the lateral excursion barriers, is omitted for clarity).

The rotary actuator 144 is rigidly connected to the pivot arms 146, whereby the rotary actuator is configured to swing the contact member from a stored position (as shown in FIG. 10) to a wheelchair engaging position (as shown in FIG. 11). The swinging action of the wall side barrier 140 significantly reduces the footprint of the wall side barrier (at least in the width direction), as compared to devices which utilize a double acting cylinder (see US Patent Application Publication No. US2006/0159542), while at the same time significantly increasing the operational range of movement of the contact member 148. The range of movement of the press plates of the prior art, which are activated simple double acting cylinders aligned parallel with the direction of travel, are limited to the approximate length of the double acting cylinders. To increase the range of movement, when using a double acting cylinder in this manner, the length of the cylinder must be proportionately increased. By increasing the length of the double acting cylinder, the width of the wheelchair docking station correspondingly increases. This is undesirable in the bus industry, since the industry has recognized the need for increased width aisles and, accordingly, has lately become much more sensitive to the width dimension (i.e., the dimension which is transverse to the travel direction of the bus) of seating arrangements. To solve this problem, and to provide greater flexibility in the type and size of wheelchairs (and other limited mobility devices) that can be restrained, the second embodiment of the wheelchair passenger station utilizes a swinging action for the wall side barrier 140. The range of movement of the wall side barrier is proportional to the length of the pivot arms 146. An increase in range of movement can be obtained, without increasing the width dimension of the barrier 140, by merely increasing the length of the pivot arms.

The pivot arms 146 not only swing the contact member 148 into engagement with the wheelchair, but are also rotatably connected to the contact member 148, to allow the contact member 148 to pivot with respect to the pivot arms 146 to accommodate various sized and shaped wheelchairs. The shown embodiment of the contact member 148 pivots along vertical axis. However, it is contemplated that the contact member could pivot along a horizontal axis or both vertical and horizontal. For example, the contact member 148 could be mounted to the pivot arms 146 via a ball joint. The contact member 148 is generally positioned to engage with the wheel structures of the wheelchair, and such structures are usually not flat. Some electric wheelchairs have contoured surfaces, and no flat surfaces, in this region. The pivoting contact member, therefore, provides for better engagement with such non-flat surfaces. The pivoting action of the contact member 148 also allows for sufficient contact with a wheelchair which enters into the wheelchair passenger station 110 in a biased configuration (i.e., aligned at an angle in the station 110). It can therefore be said that the rotatable connection between the pivot arms 146 and the contact member 148 allows the contact member to align itself with the wheelchair, regardless of whether the wheelchair is positioned square in station 110, and to conform to the shape of the wheelchair to maximize the contact surface area with the wheelchair.

The wheelchair contact pad 149 of the wall side barrier 140 is made of an abrasion resistant, high-friction, elastomeric material (with or without a covering or upholstering) so as not to damage the wheelchair and provide maximum resistance to wheelchair movement relative to the vehicle. The aisle side arm 130 has a similar contact pad 131 that is made of the same or similar material as is the contact pad 149. Both the wall side barrier 140 and the aisle side arm 130 may include wheelchair engaging surfaces. These surfaces may be comprised of a soft or spongy material to firmly engage, but not damage, the wheels and spokes of a wheelchair.

Figure 13:
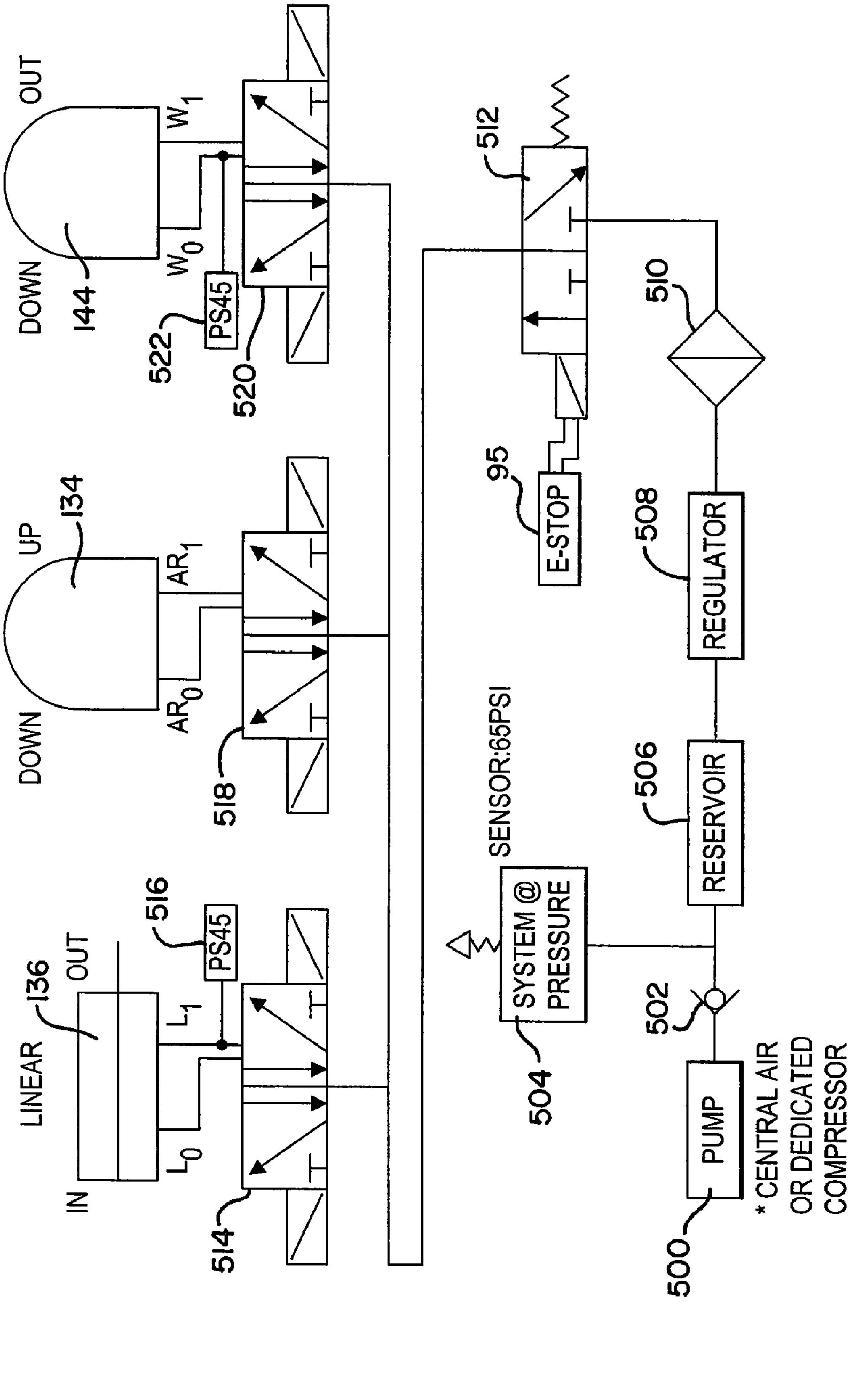
FIG. 13 is a pneumatic circuit diagram for the electro-pneumatic control system of the second embodiment.

With reference now to FIG. 13, a pneumatic circuit diagram of the electro-pneumatic control system for the second embodiment of the wheelchair passenger station 110 is shown. Compressed air is provided to the control system via a pump 500, which could be part of the vehicle compressed air system or could be a stand-alone compressor which is dedicated to the wheelchair passenger station 110. Downstream from the pump 500 is a one-way valve 502, which prevents the release of compressed air through the pump 500 when the pump 500 is not operational. Downstream from the one-way valve 502 is a limit switch or pressure sensor 504 which in the shown embodiment is set at 65 psi to prevent over-pressurization of the control system. Also downstream from the one-way valve 502 is a compressed air reservoir 506 and then a regulator 508, the regulator 508 reducing the pressure to that required by the system (for the shown embodiment, approximately 45 psi). Downstream from the regulator 508 is an air filter/drier 510 to remove moisture from the compressed air. Downstream from the filter/drier 510 is a three-position, two-way emergency release valve 512 which is interconnected with the emergency stop control panel 95. In this embodiment, the emergency release valve 512 is a solenoid valve which in a powered state provides compressed air to the system components (i.e., the linear slide 136 and the rotary actuators 134, 144). In an unpowered state, the emergency release valve 512 defaults to releasing pressure from the system to the environment, thereby allowing the lateral excursion barriers 130, 140 to be manually released from engagement with the wheelchair. Manual release from the barriers would probably require less than 5 lbs of force to move them out of the way. An electric wheelchair would be sufficient to move the barriers. The emergency release valve 512 can also be activated in such a manner to release the pressure by means of the emergency stop control panel 95, specifically by pushing the emergency stop control button 96.

Downstream from the emergency stop valve 512 are three five-position, two-way valves 514, 518, 520, each of which controls the flow of compressed air to the linear slide 136, the rotary actuator 134, and the rotary actuator 144, respectively. These valves are controlled by a circuit board or a programmable logic controller (PLC). Valves have 2 positions. CB sends electrical pulse to tell valves which position to be in, which then directs the air. When compressed air is directed into line $L_1$ from valve 514, the linear slide (and therefore the arm 130) is forced inwardly from the aisle to exert pressure on the wheelchair. Pressure sensor 516 is provided on this line to measure the pressure of the compressed air which reaches the linear slide. Measurement of the pressure at this point gives an indication of the amount of force that is being exerted on the wheelchair by the arm. When the desired pressure level is achieved, the valve is closed so that no additional pressure is exerted by the slide. Conversely, when compressed air is directed into line $L_0$ from valve 514, the linear actuator (and therefore the arm 130) is forced outwardly towards the aisle to release the pressure on the wheelchair.

When compressed air is directed into line $AR_1$ from valve 518, the arm 130 is rotated downwardly towards the storage position (i.e., clockwise when the station 110 is disposed on the right side of the vehicle and when viewed from the aisle) and when compressed air is directed into line $AR_0$ from valve 518, the arm 130 is rotated upwardly towards the wheelchair ready position (i.e., counter-clockwise when the station 110 is disposed on the right side of the vehicle and when viewed from the aisle).

Figure 14A:
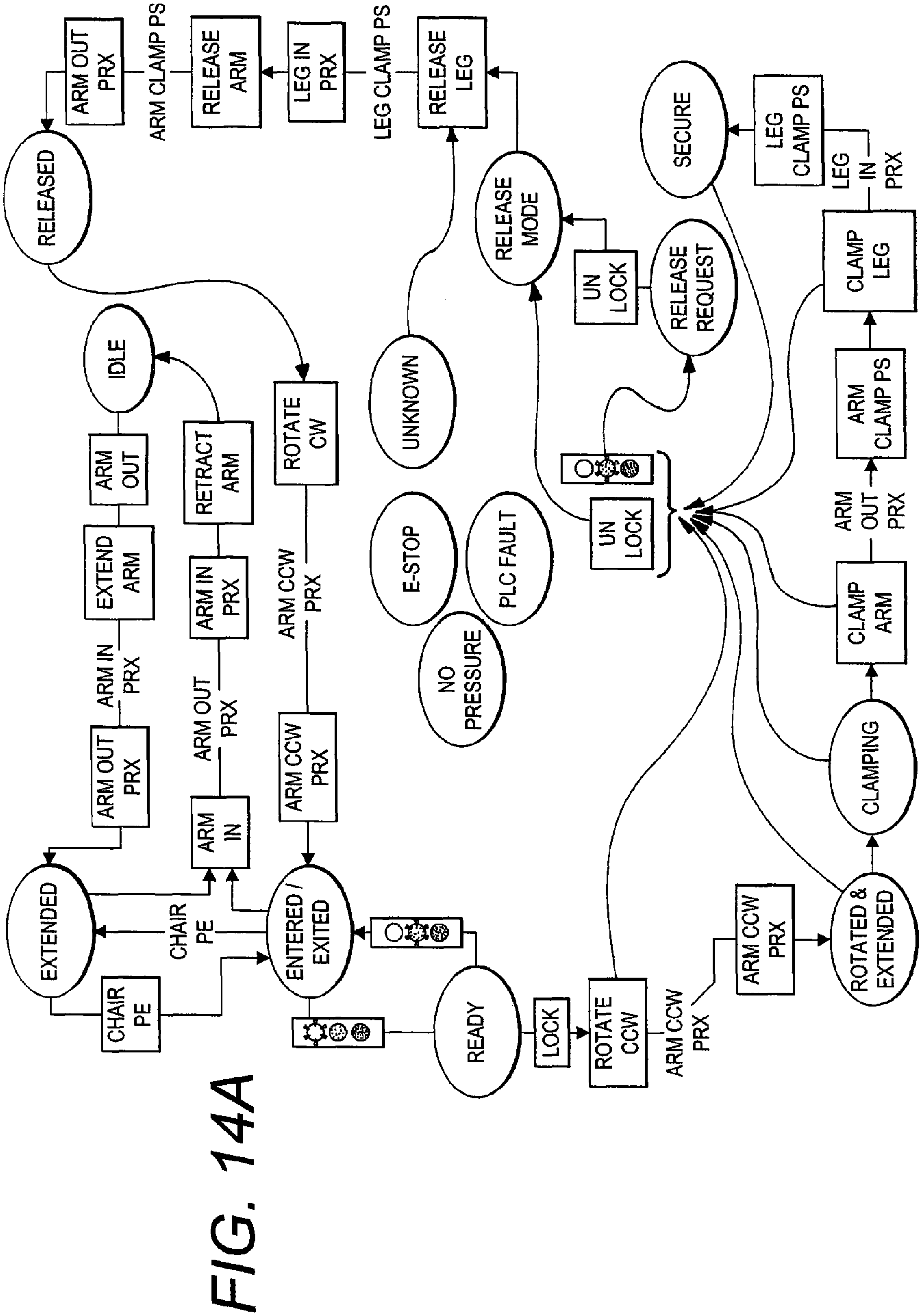
FIG. 14 is a state flow diagram for the electro-pneumatic control system of the second embodiment.
Figure 14B:
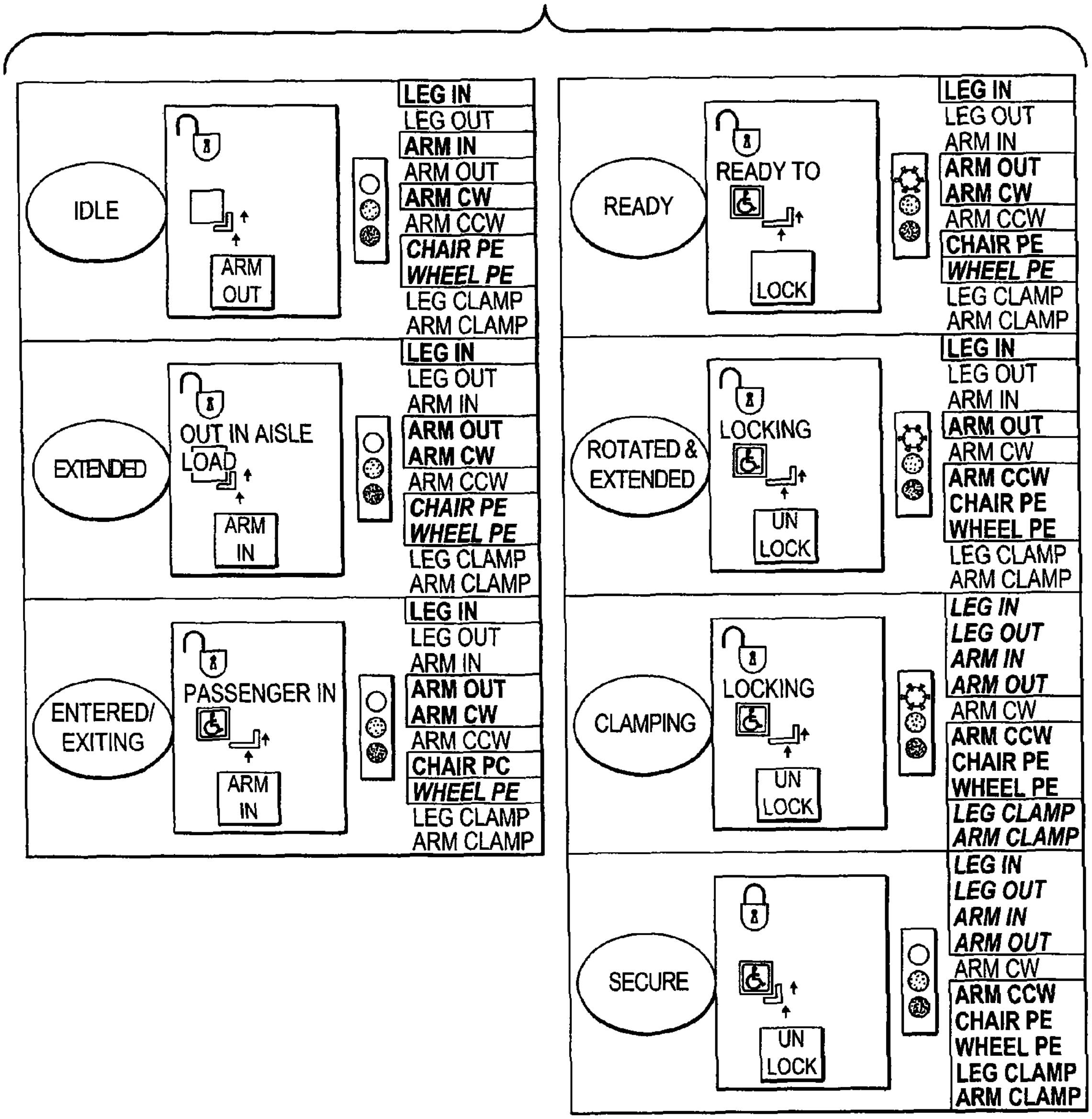
Figure 14C:
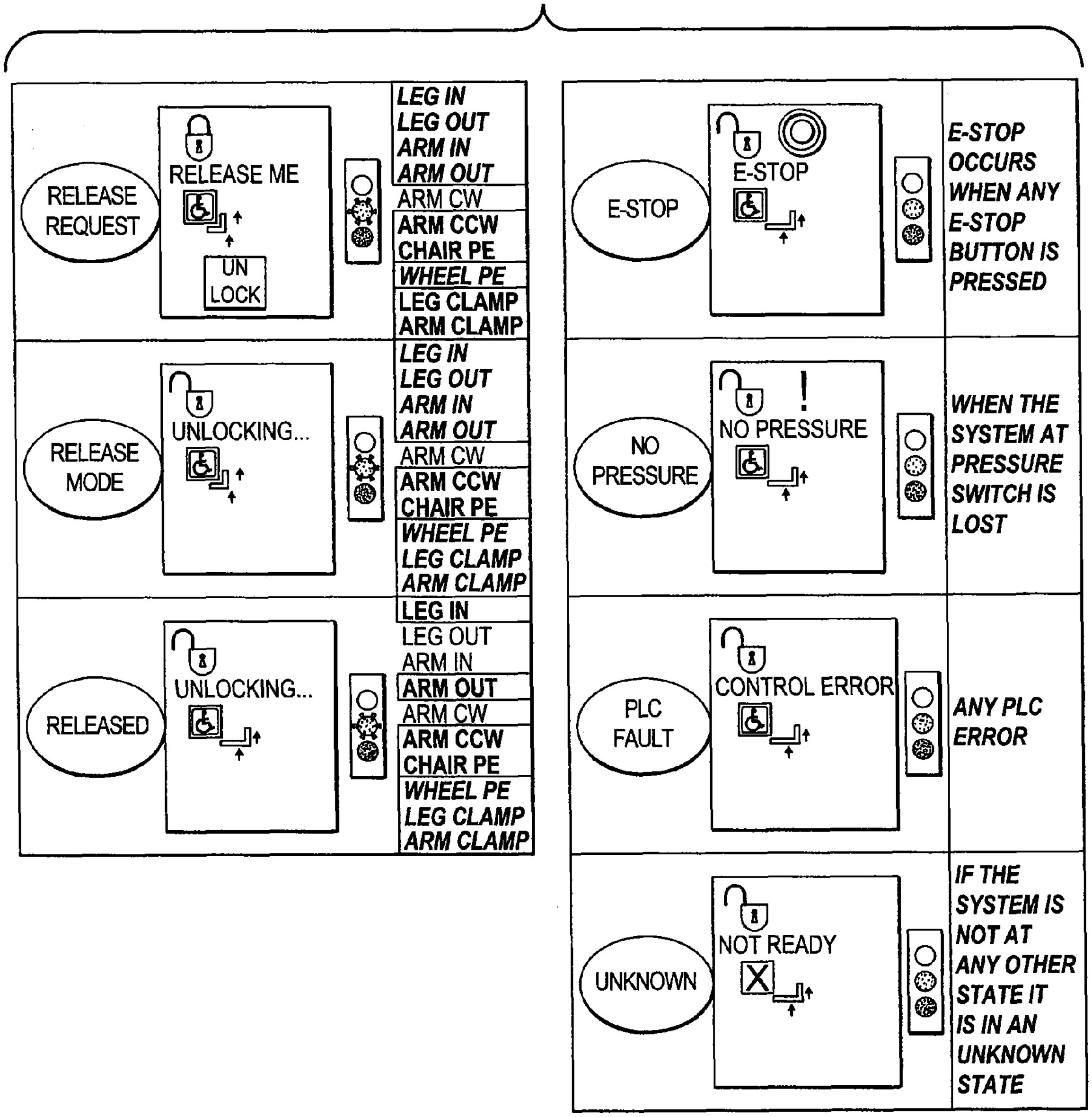

When compressed air is directed into line $W_0$ from valve 520, the rotary actuator is caused to rotate in such a direction to force the contact member 148 outwardly from the wall to exert pressure on the wheelchair. Pressure sensor 522 is provided on this line to measure the pressure of the compressed air which reaches the rotary actuator 144. Measurement of the pressure at this point gives an indication of the amount of force that is being exerted on the wheelchair by the wall side barrier 140. When the pressure level is achieved, The valve is closed so that no additional pressure is exerted by the slide. Conversely, when compressed air is directed into line $W_1$ from valve 520, the rotary actuator 144 is caused to rotate in such a direction to force the contact member 148 inwardly toward the wall to release pressure on the wheelchair Referring now to FIG. 14, a state flow diagram of the control system is depicted. FIG. 14 outlines the logic embedded in a programmable logic controller for controlling the operation of the wheelchair passenger station 110 of the second embodiment. Essentially, there are fourteen states or conditions of the wheelchair passenger station: Idle, Extended, Entered/Exiting, Ready, Rotated & Extended, Clamping, Secure, Release Request, Release Mode, Released, Emergency Stop ("E-stop"), No Pressure, Programmable Logic Control (PLC) Fault, Unknown. The flow diagram on the left side of FIG. 14 depicts how the system progresses from one mode (or state or condition) to the next. On the right hand side of FIG. 14 are screen shots of an operator's touch-screen control panel as it would appear for each of the above-mentioned modes.

On the left hand side of the control panel is displayed an indication of which mode the system is in. In the center of the control panel is displayed a graphical representation of the wheelchair passenger station. The box represents the wheelchair station, the "L" shaped member represents the arm 130, and the footprints represent the aisle or walkway. When the "L" shaped member overlaps the footprints, the control panel is visually indicating that the arm could potentially be blocking the aisle. When the box includes a wheelchair symbol, this means that the wheelchair passenger has properly entered and backed into place in the station 110. When the box includes the term "LOAD," this means that the station 110 is ready for receiving a wheelchair passenger. When the box includes the "X" symbol, this means that the station 110 is in an unknown state, which could be caused by an unknown system error.

Near the right hand side of the control panel is a graphical representation of a wheelchair passenger control box which is disposed near the wheelchair passenger station. The control box includes three buttons. The top button, which can be green, is a wheelchair ready button. The wheelchair passenger will press this button after backing into place to alert the operator that he/she is ready to be locked into place. As an alternative to use of the ready button, the control system can be programmed such that the ready mode will be activated after the chair photo eye sensor, as described below, detects that the wheelchair has been in place in the station 110 for predefined period of time. The middle button, which can be blue, is the stop request button. The wheelchair passenger will push this button when he/she desires to exit the vehicle. The operator will be alerted that the wheelchair passenger, as opposed to any other non-wheelchair passenger, wants to exit the bus. For example, after pressing the button, the term "RELEASE ME" may appear on the control screen (see screen shot for Release Request mode). The bottom button, which can be red, is an emergency release button. When the wheelchair passenger activates this button, one of two things can happen. First, the emergency release valve 512 could be directly activated to release the system pressure. Alternatively, the operator could be alerted to the emergency via the control panel, who would subsequently stop the vehicle and activate the emergency release button 96. Depending upon how the system is configured, the operator could potentially activate the emergency release valve 512 via an active soft key on the control panel as well.

On the right hand side of the control panel are additional status indicators: "Leg In," "Leg Out," "Arm In," "Arm Out," "Arm CW," "Arm CCW," "Chair PE," and "Wheel PE," "Leg Clamp," "Arm Clamp." These status indicators are highlighted or otherwise illuminated when the respective condition is met. In the shown embodiment, the applicable status indicators are highlighted green, although they may be highlighted in other colors or other manners. During certain modes, certain of the status indicators may not be applicable; for such cases, the inapplicable status indicators may be highlighted grey.

The "Leg In" indicator is illuminated when the leg (i.e., the wall side barrier) 140 is in the in or retracted position. The "Leg Out" indicator is illuminated when the wall side barrier 140 is in the out or extended position. The "Arm In" indicator is illuminated when the arm is in the retracted position (both when the arm is retracted in the stored position and when the arm is engaged with the wheelchair). The "Arm Out" indicator is illuminated when the arm 130 is in the extended position. The "Arm CW" indicator is illuminated when the arm 130 is in the clockwise (hence "CW") position when viewed from the aisle. For a station 110 which is installed on the right side of the vehicle, this means that the arm is in the downward position. The "ARM CCW" indicator is illuminated when the arm 130 is in the counter-clockwise (hence "CCW") position when viewed from the aisle. For a station 110 which is installed on the right side of the vehicle, this means that the arm is in the upward position. The "Chair PE" indicator is illuminated when a photo eye (hence "PE") sensor detects that the wheelchair is in close proximity to the forward excursion barrier 120. The photo eye sensor is disposed on the barrier in the head rest/wheelchair stop 122, 124 area and has a defined maximum distance (<=0.5 inch) in which it can detect the presence of the wheelchair. The PE sensor is "de-bounced"; that is, it does not activate the "Chair PE" indicator unless it detects the wheelchair for a predefined period of time, perhaps at least 1 second or more. This prevents false signals to the driver and controller due to electrical interference or accidental triggering by another passenger moving past the system. The "Wheel PE" indicator is illuminated when a photo eye sensor detects that the wheelchair is in position. This photo eye sense is disposed at some location on the arm 130 and has a greater maximum distance as compared to the previously discussed PE sensor. The Wheel PE sensor may not be effective until the arm 130 is rotated upward during the locking sequence. Like the chair PE sensor, the wheel PE sensor is "de-bounced". The "Leg Clamp" indicator is illuminated when the pressure sensor 522 detects that sufficient pressure is being provided to the rotary actuator 144 to confirm that adequate clamping force is being provided by the wall side barrier 140. The "Arm Claim" indicator is illuminate when the pressure sensor 516 detects that sufficient pressure is being provided to the linear slide 136 to confirm that adequate clamping force is being provided by the aisle side barrier or arm 130.

Depending upon which mode the system is in, various active soft keys are provided on the control panel which allow the operator to activate the lateral barriers 130, 140. For example, as shown in FIG. 14, when the station 110 is in the Idle state, the control panel displays an active soft key labeled "ARM OUT," which when touched causes the arm 130 to extend outwardly in a lateral direction from the forward excursion barrier 120. In the Extended and Entered/Exiting state, the control panel displays an active soft key labeled "ARM IN," which when touched causes the arm 130 to extend inwardly in a lateral direction into the forward excursion barrier 120. In the Ready state, the control panel displays an active soft key labeled "LOCK" which when touched first causes the arm 130 to rotate upwardly into position and then causes both the arm 130 and the wall side barrier 140 to squeeze (or lock) the wheelchair in place. In the Rotated & Extended, Clamping, Secure, and Release Request state, the control panel displays an active soft key labeled "UNLOCK" which when touched first causes both the arm 130 and the wall side barrier 140 to release (or unlock) the wheelchair (i.e., the arm 130 moves toward the aisle and the wall-side barrier 140 moves towards the wall) and then the arm is rotated downwardly so that it may later be returned to the Idle state (i.e., by pushing the "ARM IN" button) or so that another wheelchair passenger may be secured (i.e., by again pushing the "LOCK" button).

Turning now to the state flow diagram, on the left hand side of FIG. 14, the initial state of the wheelchair passenger station 110 is Idle (on the flow diagram, therefore, the starting point is near the top right corner of the flow diagram at the oval box labeled Idle). In this state, the wheelchair passenger station 110 is configured for non-wheelchair passenger seating. In other words, the lateral barriers 130, 140 are in their stored position to allow non-wheelchair passengers to enter and sit on the side facing flip-seats. With reference to the control panel screen shot for the Idle mode, the Leg In, Arm In, Arm CW. indicators are highlighted green. These status indicators are activated by a Leg In proximity switch, an Arm In proximity switch, and an Arm CW proximity switch. These proximity switches are magnetic type proximity sensors (such as the Pepperl & Fuchs NBN2-8GM40-E2-V1 sensor). A person of skill in the art would understand that these (and other below described) proximity switches could be installed in many different configurations, and for this reason such details are not specifically shown in the figures. Notwithstanding this fact, the Leg In proximity switch is aligned with either a raised or notched portion of the output shaft of the rotary actuator 144 to detect when the wall side barrier is fully retracted (if raised portion, it will sense the shaft; if notched portion, it will lose its sense of the shaft). The Arm In proximity switch is disposed inside the forward excursion barrier along the travel path of the linear slide 136 at a location where it will be in close proximity to the linear slide 136 when the arm is fully retracted. The Arm CW proximity switch is aligned with either a raised or notched portion of the output shaft of the rotary actuator 134 to detect when the arm is fully lowered (if raised portion, it will sense the shaft; if notched portion, it will lose its sense of the shaft).

When a wheelchair passenger enters the vehicle, the operator will press the ARM OUT soft key on the control panel. As reflected in the state flow diagram, the arm begins to extend out from the forward excursion barrier 110—thereby causing the Arm In proximity switch lose its sense of the linear slide 136 and deactivating the Arm In indicator—until an Arm Out proximity switch (i.e., "PRX" in state flow diagram) senses that the arm 130 is fully extended. The Arm Out proximity switch is disposed inside the forward excursion barrier along the travel path of the linear slide 136 at a location where it will be in close proximity to the linear slide 136 when the arm is fully extended. Once the Arm Out proximity switch senses that the linear slide 136 is in close proximity to the sensor, Arm Out indicator is highlighted green on the operator's control panel. At this point, the wheelchair passenger station 110 is in the Extended state. As an alternative to the use of a proximity switch, a timer may be used which is set to the length of time required for the arm to fully extend.

In the Extended state, the operator has the option of returning to the Idle state by pushing the ARM IN soft key. If pushed, the Arm begins to retract—thereby deactivating the Arm Out indicator—until the Arm In proximity switch detects that the linear slide is fully retracted. At this point, the Arm In indicator becomes highlighted in green and the wheelchair passenger station returns to the Idle state. As an alternative to the use of a proximity switch, a timer may be used which is set to the length of time required for the arm to fully retract.

Assuming that the operator does not push the ARM IN soft key, the station 110 stays at the Extended state until the wheelchair passenger backs into place and is sensed by the Chair photo eye sensor. Once the chair is detected by the photo eye sensor, the station 110 enters the Entered/Exiting state and the Chair PE indicator is highlighted green. If the photo eye sensor loses sight of the chair, the station 110 returns to the Extended state. If the operator pushes the ARM IN soft key, the station 110 returns to the Idle in the same manner as if the operator pressed the ARM IN soft key during the Extended mode. Assuming the station 110 is in the Entered/Exiting state, the photo eye sensor maintains sight of the chair, and the operator does not push the Arm In soft key, the station remains in the Entered/Exiting state until a predetermined time period has passed, or until the wheelchair passenger presses the ready button. Once either of these situations occur, the station enters the Ready state.

The station 110 remains in the Ready state until one of two things occur; either until the wheelchair passenger presses the stop request button, in which case the station 110 returns to the Entered/Exiting state or until the operator pushes the LOCK soft key. Once the LOCK soft key is pressed, the rotary actuator 134 begins to rotate the arm upward (or counter-clockwise for the shown embodiments), thereby deactivating the Arm CW indicator. From this point forward, during the Rotated & Extended, Clamping, and Secure states, the locking sequence can be deactivated by the wheelchair passenger or the operator. The wheelchair passenger can deactivate the locking sequence by pressing the stop request button, at which point the station 110 will enter the Release Request mode which is discussed further below. The operator has the option to cancel the locking sequence by pressing the UNLOCK soft key, which when pressed will place the station 110 in the Release mode, which is also discussed further below.

Assuming that neither the wheelchair passenger nor the operator opt to cancel the locking sequence, the arm continues to rotate counter-clockwise until the Arm CCW proximity switch detects that the arm is fully rotated, and the arm photo eye sensor detects the wheel of the wheelchair. The Arm CCW proximity switch is aligned with either a raised or notched portion of the output shaft of the rotary actuator to detect when the arm is fully raised (if raised portion, it will sense the shaft; if notched, it will lose its sense of the shaft). Once the proximity switch detects full rotation of the arm and the arm photo eye sensor detects the wheel, the Arm CCW and Wheel PE indicators are highlighted green and the station 110 enters the Rotated and Extended state.

At this point, the locking sequence continues by simultaneously activating the linear slide 136 and the rotary actuator 144 to move the arm 130 and contact member 148 towards the wheelchair. At this point, the Arm Out and Leg In indicators are deactivated by the associated proximity switches and the station 110 enters the Clamping state. The Secure state is entered only when the pressure sensors 516, 522 detect a predetermined amount of pressure, which for the shown and described embodiments has been determined to be approximately 45 psi. This value may vary depending upon the size and type of linear slides and rotary actuators used. Once the sensors 516 and 522 detect this predetermined amount of pressure, the Arm Clamp and Leg Clamp indicators are highlighted green and the rotary actuator 144 and linear slide 136 are deactivated.

In the event that the leg clamp pressure sensor 522 fails to detect the predetermined amount of pressure, the rotary actuator 144 will continue to rotate until the Leg Out proximity switch detects that the wall side barrier is fully extended. The Leg Out proximity switch is aligned with either a raised or notched portion of the output shaft of the rotary actuator 144 to detect when the barrier 140 is fully extended (if raised portion, it will sense the shaft; if notched, it will lose its sense of the shaft). Once the proximity switch detects full extension of the barrier 140, the Leg Out indicator is highlighted green. If such a situation occurs, this is an indication that the wheelchair is too small to be secured in the station 110, or some other error has occurred. This will likely place the station 110 in the unknown state, which automatically activates the release of the arm and leg in the manner described below for the Release Mode.

The wheelchair passenger station 110 remains in the Secured state until either the operator presses the UNLOCK soft key, or the wheelchair passenger presses the stop request button. Pressing the stop request button causes the station 110 to enter the Release Request state, in which the operator is alerted to the fact that the wheelchair passenger wishes to be released. At this point, an UNLOCK soft key appears on the control panel.

When the UNLOCK soft key is pressed in the Release Request State (or when the arm is rotating counter-clockwise or when the station 110 is in the Rotated & Extended, Clamping, or Secure states), the station 110 enters the Release Mode. In the Release mode, the linear slide 136 and the rotary actuator are activated to release the wheelchair. At this point, the pressure sensors 516, 522 lose pressure which causes the Leg Clamp and Arm Claim indicators to deactivate. The linear slide 136 continues to move outward until the Arm Out proximity switch detects that the arm 130 is fully extended and the rotary actuator continues to retract until the Leg In proximity switch detects that the wall side barrier 140 is fully retracted. At this point, the Leg In and Arm Out indicators are highlight green on the control panel and the station 110 enters the Released Mode. At this point, the rotary actuator 134 is activated to rotate the arm clockwise thereby deactivating the Arm CCW indicator. The rotary actuator 134 continues to rotate the arm clockwise until the Arm CW proximity switch detects that the arm is fully rotated. Once fully rotated, the Arm CW indicator is highlighted green and the station 110 enters the Entered/Exiting mode, as described above.

At any point during the operation of the station 110, the station 110 may enter a No pressure mode, an Emergency Stop mode, and a PLC fault mode. The station 110 enters the No Pressure mode when the pressure sensor 504 detects a lack of a predetermined amount of pressure, which in this case is 65 psi. The station 110 enters the PLC fault mode in response to any error in the programmable logic controller. The station 110 enters the E-stop mode when any emergency stop button is pressed.

Although the control system as shown and described is quite elaborate, the claims are not limited as such, unless such details are explicitly recited. Indeed, much simpler systems are contemplated, such as one that merely includes four buttons (ARM IN, ARM OUT, LOCK, UNLOCK) and possibly a status indicator as shown in FIG. 8.

Figure 15:
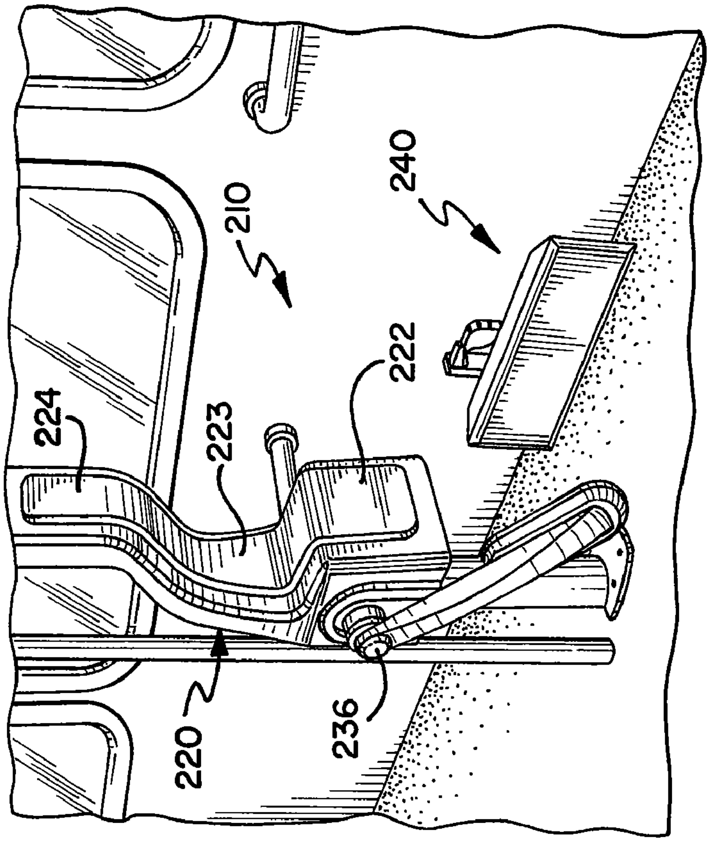
FIG. 15 is a perspective view of a third embodiment of a wheelchair passenger station with the lateral excursion barriers placed in an extended, wheelchair engaged position (again, the wheelchair, which would normally be present between the lateral excursion barriers, is omitted for clarity).

A third embodiment of a wheelchair passenger station 210 is depicted in FIG. 15. The third embodiment of the station 210 is in large respect identical to the second embodiment of the station 110. However, the forward excursion barrier 220 of the third embodiment includes a depressed, or recessed, portion 223 between the head restraint portion 224 and wheelchair stop portion 222. The depressed portion 223 is designed to accommodate wheelchairs which have laterally extending tie bars between the push handles, which are commonly disposed rearward of the wheelchair seat back. The forward excursion barrier 220 also includes a warning light 236 to alert bystanders and the wheelchair passenger of impending or actual movement. Finally, the wall side barrier 240 is wall mounted as opposed to the floor mounted configuration of the second embodiment.

Although the inventions described and claimed herein have been described in considerable detail with reference to certain embodiments, one skilled in the art will appreciate that the inventions described and claimed herein can be practiced by other than the embodiments shown herein, which have been presented for purposes of illustration and not of limitation. Therefore, the spirit and scope of the appended claims should not be limited to the description of the embodiments shown and described herein.

We claim:

1. A wheelchair passenger station for a transport vehicle, the wheelchair passenger station comprising:

a forward excursion barrier which is adapted to prevent forward movement of a wheelchair relative to the vehicle;

at least one moveable chair engaging support to restrict lateral movement of the wheelchair, the moveable chair engaging support comprising at least one pivot arm which is configured to move between a stored position and a chair engaging position at least partially through rotation;

the moveable chair engaging support being movable between the stored position, at least one intermediate position, and the chair engaging position;

the movable chair engaging support being located in the stored position to provide lateral access for the wheelchair into the wheelchair passenger station;

the movable chair engaging support being movable from the stored position to the intermediate position while the wheelchair is positioned in the wheelchair passenger station, where the movable chair engaging support is laterally spaced from at least a portion of the wheelchair; and, the movable chair engaging support being movable from the intermediate position to the chair engaging position, where the movable chair engaging support engages with the wheelchair to restrict lateral movement of the wheelchair.

2. The wheelchair passenger station of claim 1, wherein the forward excursion barrier includes a head restraint portion, a wheelchair stop portion, and a depressed portion disposed therebetween, the depressed portion being configured to receive various styled wheelchairs having structure which is laterally oriented and which is disposed rearward of a back rest of the wheelchair, the depressed portion allowing the wheelchair back rest to abut the wheelchair stop of the forward excursion barrier.

3. The wheelchair passenger station of claim 1, wherein the forward excursion barrier is positioned near a front side of the wheelchair passenger station whereby a back and a head of the wheelchair passenger would be adjacent the forward excursion barrier when secured.

4. The wheelchair passenger station of claim 1, wherein the portion of the moveable chair engaging support that engages with the wheelchair is a contact member, the contact member being pivotally attached to the pivot arm at a free end to more effectively engage with an uneven surface of the wheelchair.

5. The wheelchair passenger station of claim 1, wherein the movable chair engaging support is attached to the forward excursion barrier.

6. The wheelchair passenger station of claim 1, wherein the movable chair engaging support moves from the stored position to the intermediate position at least partially by lateral movement.

7. The wheelchair passenger station of claim 1, wherein the movable chair engaging support moves from the intermediate position to the wheelchair engaging position at least partially by rotation.

8. The wheelchair passenger station of claim 1, wherein the moveable chair engaging support comprises a first portion and a second portion extending from the first portion, whereby the second portion of the moveable chair engaging support engages with the wheelchair.

9. The wheelchair passenger station of claim 8, wherein at least one of the first and second portion of the moveable chair engaging support moves at least partially by rotation.

10. The wheelchair passenger station of claim 1, wherein the at least one movable chair engaging support includes a first movable chair engaging support and a second moveable chair engaging support, the first movable chair engaging support engaging with at least a portion of a first side of the wheelchair and the second moveable chair engaging support engaging with at least a portion of a second side of the wheelchair, whereby the first moveable chair engaging support and the second movable chair engaging support collectively exert a compressive force on the wheelchair.

11. The wheelchair passenger station of claim 1 further comprising a monitoring system for the at least one movable chair engaging support, the monitoring system providing an indication regarding the status of the wheelchair passenger station.

12. The wheelchair passenger station of claim 11 wherein the status includes the position of the at least one movable chair engaging support.

13. The wheelchair passenger station of claim 12, wherein the wheelchair passenger station further comprises at least one sensor for detecting the position of the at least one moveable chair engaging support.

14. The wheelchair passenger station of claim 11, wherein the monitoring system provides an indication when the at least one movable chair engaging support is moving.

15. The wheelchair passenger station of claim 14, wherein the indication is visual, auditory, or both.

16. The wheelchair passenger station of claim 11, wherein the monitoring system includes at least one interface that provides the indication regarding the status of the wheelchair passenger station, wherein the indication is visual, auditory or both.

17. The wheelchair passenger station of claim 11, wherein the status includes an indication of the amount of force that is being applied to the wheelchair by the at least one movable chair engaging support.

18. The wheelchair passenger station of claim 11, wherein the status includes whether a wheelchair passenger is positioned in the wheelchair passenger station.

19. The wheelchair passenger station of claim 1 further comprising a control system for controlling the movement of the at least one movable chair engaging support between the stored position and the chair engaging position.

20. The wheelchair passenger station of claim 19, the control system being responsive to at least one sensor.

21. The wheelchair passenger station of claim 20, wherein the at least one sensor includes a sensor that provides an indication of the amount of force being applied to the wheelchair by the at least one movable chair engaging support.

22. The wheelchair passenger station of claim 20, wherein the at least one sensor includes a sensor that provides an indication of whether a wheelchair passenger is positioned in the wheelchair passenger station.

23. The wheelchair passenger station of claim 20, wherein the at least one sensor includes a sensor that provides an indication of the position of the at least one moveable chair engaging support.

24. The wheelchair passenger station of claim 19 wherein the control system is electro-pneumatic.

25. A wheelchair passenger station for a transport vehicle, the wheelchair passenger station comprising:

a forward excursion barrier which is adapted to prevent forward movement of a wheelchair relative to the vehicle;

a first lateral barrier being disposed on a first side of the wheelchair passenger station;

a second lateral barrier being disposed on a second side of the wheelchair passenger station;

the first and second lateral barriers being movable to engage with the wheelchair from opposite sides to prevent lateral movement of a wheelchair relative to the vehicle;

the first lateral barrier also being moveable between a stored position and a wheelchair restraining position, the first lateral barrier being positionable in the stored position to allow lateral access to the wheelchair passenger station by a wheelchair passenger, and subsequently being transferable to the wheelchair restraining position while the wheelchair passenger is positioned within the wheelchair passenger station.

* * * * *